Figure 6:
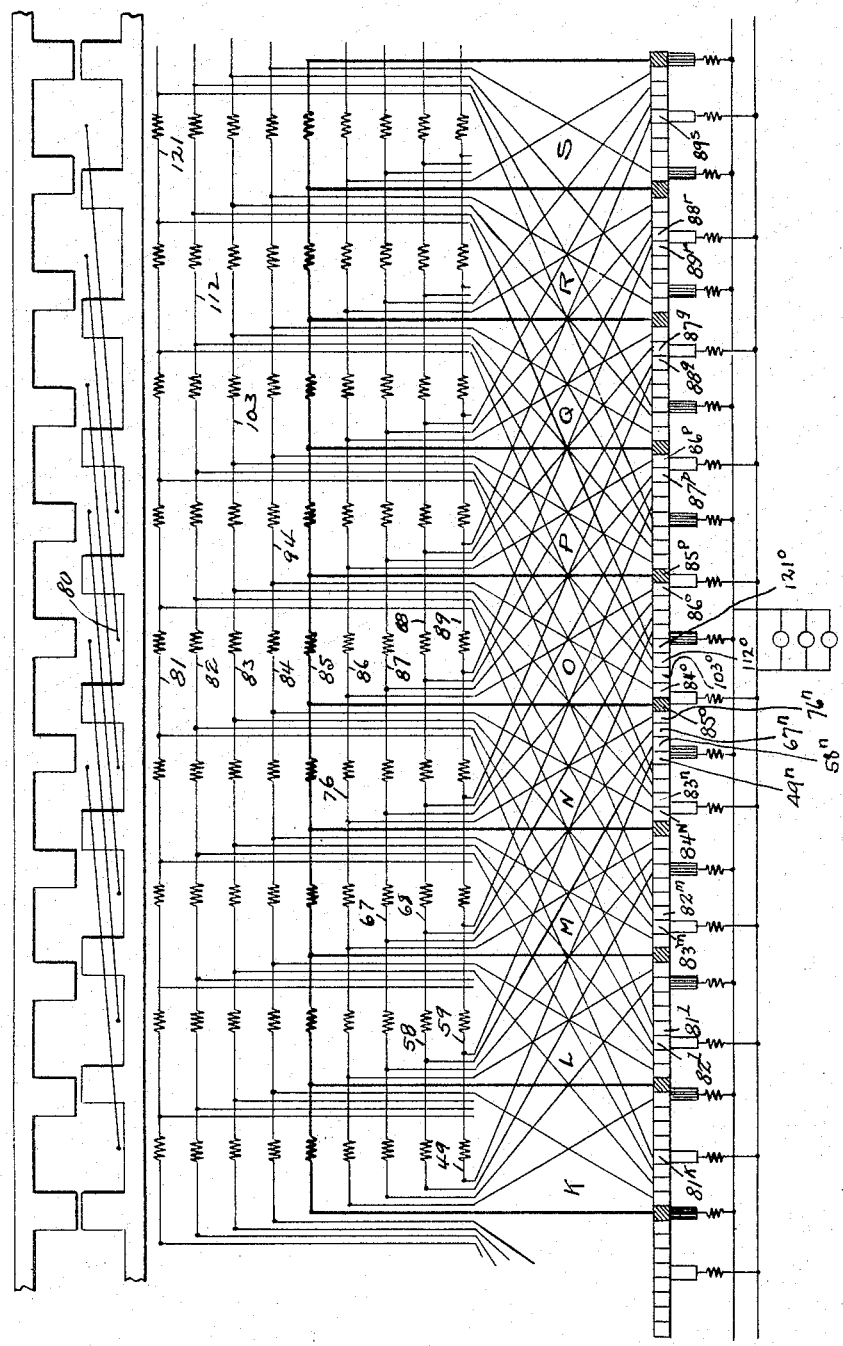

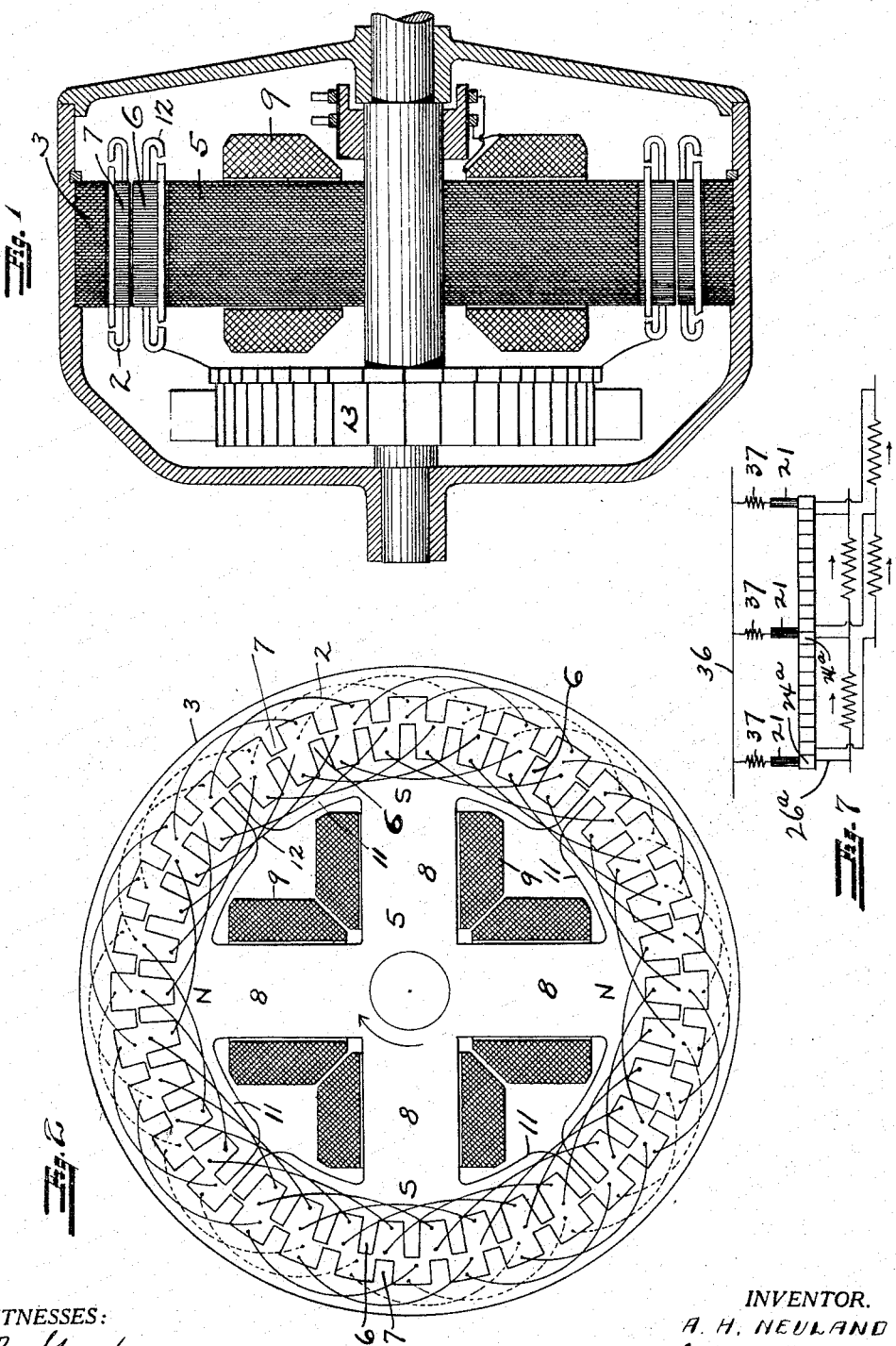

A. H. NEULAND.
DYNAMO ELECTRIC MACHINE.
APPLICATION FILED DEC. 26, 1914.
1,212,544.
Patented Jan. 16, 1917.
3 SHEETS—SHEET 2.
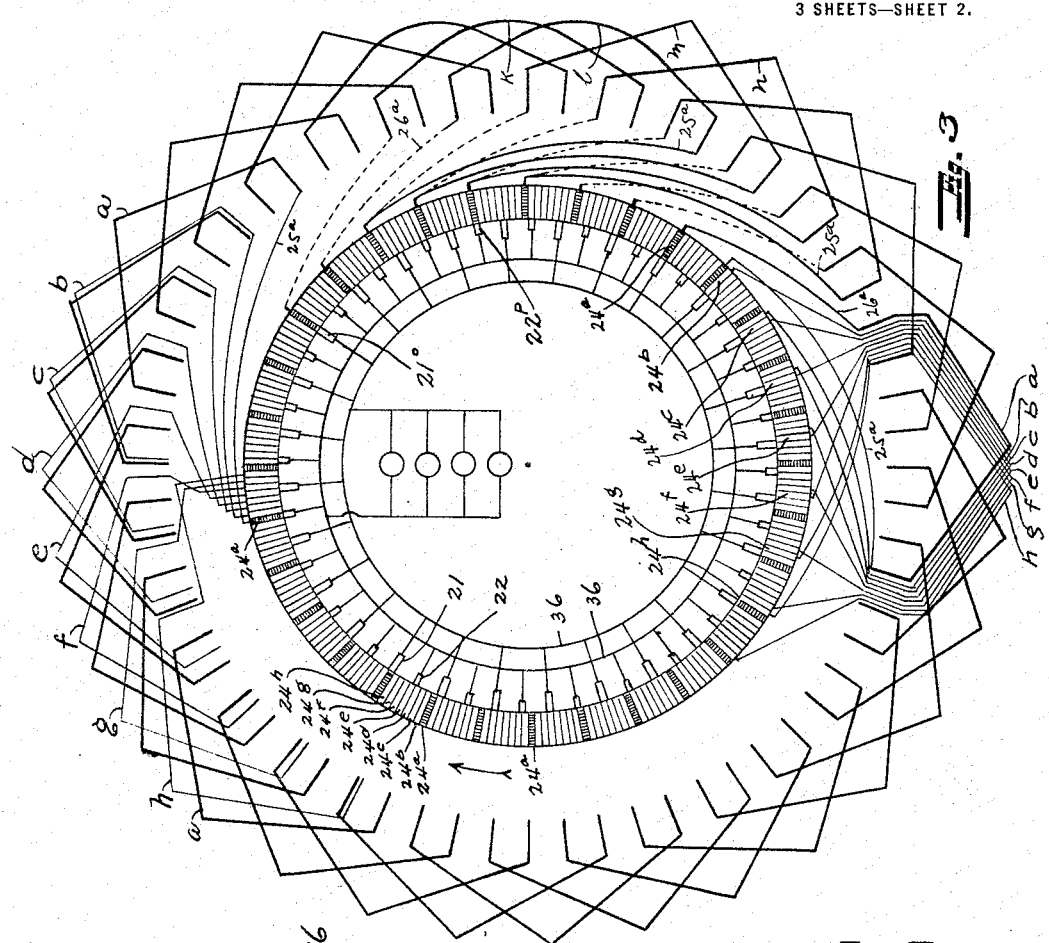
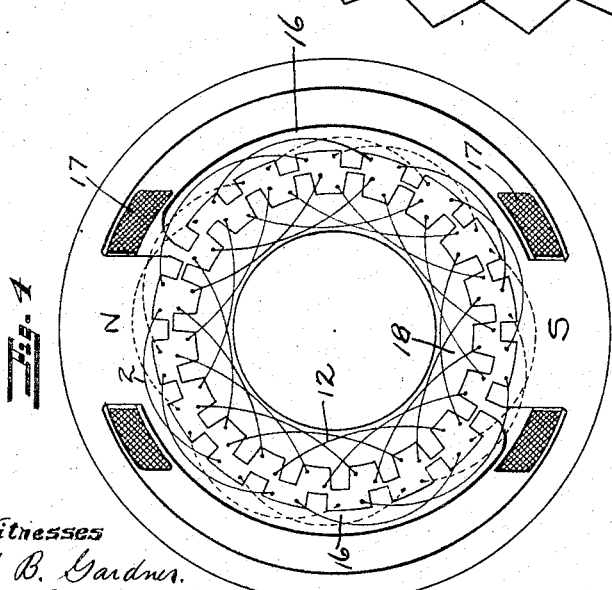
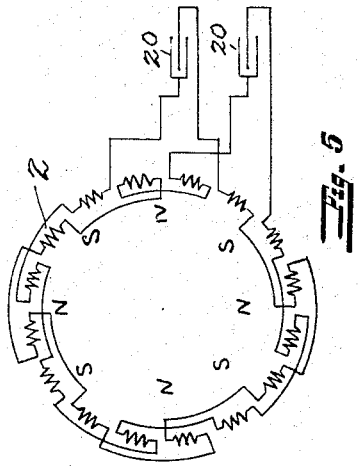
Witnesses
J. B. Gardner.
H. G. Prist.
Inventor
A. H. NEULAND
BY White & Prist
his Attorneys

UNITED STATES PATENT OFFICE.

ALFONS H. NEULAND, OF SAN FRANCISCO, CALIFORNIA.

DYNAMO-ELECTRIC MACHINE.

1,212,544. Specification of Letters Patent. Patented Jan. 16, 1917.

Application filed December 26, 1914. Serial No. 879,097.

*To all whom it may concern:*

Be it known that I, ALFONS H. NEULAND, a subject of the Czar of Russia, and a resident of the city and county of San Francisco, State of California, have invented a certain new and useful Dynamo-Electric Machine, of which the following is a specification.

The invention relates to dynamo electric machines of the commutating type, and particularly to such machines in which the field rotates at a higher angular velocity than the rotor.

An object of the invention is to provide a dynamo electric machine having successive north and south poles which follow each other in the same plane to produce in a circumferentially distributed winding the effect of a high velocity rotating field with a lower speed of revolution of the rotor.

Another object of the invention is to provide for improved commutation in a machine in which the field rotates at a higher angular velocity than the rotor, as well as to increase the commutator current capacity of such a machine.

Another object of the invention is to improve the commutation of alternating currents in the aforesaid type of machine.

The invention possesses other advantageous features, some of which, with the foregoing, will be set forth at length in the following description where I shall outline in full that form of the invention which I have selected for illustration in the drawings accompanying and forming part of the present specification. In said drawings I have shown one specific form of my generic invention, but it is to be understood that I do not limit myself to such form, because my invention may be embodied in a multiplicity of forms, each being a species of my said invention. It is also to be understood that by the claims succeeding the description of my invention, I desire to cover the invention in whatever form it may be embodied.

The class of machine to which this invention is most adapted consists of a toothed stator and a toothed rotor, the teeth on the two elements being of a pitch to form gradually closing and opening portions whereby the rotation of the rotor causes a progressing magnetic field of much higher angular velocity than that of the rotor. An induced winding is provided which is cut by the progressing or rotating flux, inducing therein an alternating current of very high frequency relative to the rotation of the rotor and the armature pole windings of which there are as many as there are closed and open portions. Ordinarily, a machine producing a high velocity field with a low rotor velocity, comprises an equidistantly toothed stator and an equidistantly toothed rotor forming closed and open portions. The field coil in this instance is located on one side of the structure and surrounds the shaft, causing the entire circumference of rotor on one side of the coil to be of the same polarity, while the armature winding on either stator or rotor is wound for as many poles as there are closed and open portions. In the present machine the flux, instead of entering the rotor at all points of the circumference and passing along the shaft back to the stator, enters the rotor at one point of the circumference and leaves it at some other. This is accomplished by having the teeth supplied by a flux of one sign the same as in the case of a unipolar arrangement, and shifting the teeth of one member with respect to the other the distance of one-half tooth pitch in that part of the rotor circumference which is supplied by a flux of opposite polarity. In this way those pole windings, of either the stator or rotor, connected in the same direction, are cut by a decreasing north or an increasing south magnetism inducing a potential therein which is in the same direction. It is obvious, therefore, that notwithstanding the difference in the pitch of those teeth which adjoin north and south poles, or rather because of that fact, the generated potentials in the thoroughly distributed rotor or stator windings are such as would be obtained from a true revolving field. The commutating means, when intended for commutation of direct current, consists of a number of coils in each slot belonging to different independent circuits and so arranged that each armature circuit has as many coils and connects to as many segments, evenly spaced around the entire circumference on the commutator, as there are cycles generated in the armature winding. The stationary positive brushes wiping the commutator are larger or smaller in number than the number of segments per circuit by the number of alined portions and contact with the segments of one circuit at as many points as there are induced winding pole-pairs. Rotation of the commutator will cause the point of contact between the positive brushes and the segments belonging to one circuit to progress at a high velocity and equal to that of the revolving field. This progression is similar to that of the progression of the alined portion and is likewise never broken but simply rapidly but gradually shifted from one brush to another. In this manner, although the field revolves, the stationary brushes cause a progression of the point of contact with the segments belonging to one circuit at an equal angular velocity and thus cause the brushes to always retain their neutral position with respect to the rotating field. There are as many negatives as there are positive brushes, and the former are spaced 180 electrical degrees from the latter. This method of commutation, employing but a single armature circuit substantially as above outlined, has been set forth in a prior application.

One of the present improvements provides for a multiple circuit winding. Each coil lodged in the slots is divided into a number of individual coils. Between each two segments belonging to a single circuit are placed as many additional segments as the number of added coils. Each one of these added segments, between any two adjacent segments of the single circuit, belongs to a different circuit and, therefore, there are as many more circuits. Each added circuit has as many coils and segments as the single circuit and is connected in the same manner individually, but the circuits have the following relation to each other. All the leads of one circuit at the commutator are displaced to all the leads of the other circuits so that from the coils lodged in a single slot they reach 360 electrical degrees around the commutator as represented by the pole windings of the armature, but not the pitch of the teeth. Therefore, rotation of the commutator causes each individual circuit to act the same as before in rapidly shifting the point of contact between each circuit and the brushes, and in addition thereto each brush, in passing from one segment to the next, passes to a different circuit. The brushes also act as connectors and equalizers between all the independent circuits. In this way the current, entering the commutator at numerous points through all the brushes of one sign, is concentrated to few points and in those coils which have quadrature relation to the field. Such an arrangement offers a number of important advantages. In the single circuit only a few brushes are active at each instant as against all the brushes being active all the time in the multiple circuit arrangement, obviously resulting in high brush economy. For the same reason the width of the commutator is reduced proportional to the increase of the active brushes. Splitting the coils, which in the single circuit would consist of one or few turns of a heavy conductor into a number of individual coils, results in greater flexibility and ease in forming windings and connecting. The current per coil and brush in the multiple circuit winding is only a small fraction of that in the single circuit winding and the commutation is, therefore, accordingly improved. When alternating currents, of lower or higher frequency than that generated in the armature, are to be collected at the commutator, a different number of segments per circuit is chosen as well as a different number of brushes, so as to cause the point of contact between the bars of one circuit and the brushes to progress at a lesser or greater angular velocity than the field cutting the armature conductors. It is obvious that the current at the brushes is now alternating although it has a different frequency than that generated in the armature. By the addition of properly spaced brushes polyphase currents may be collected at the commutator. These features will become more apparent by reference to the accompanying drawings, in which—

Figure 1 is a vertical longitudinal section of one form of machine of my invention. Fig. 2 is a diagrammatic cross sectional representation of the machine shown in Fig. 1. Fig. 3 is a diagrammatic representation of the rotor winding and commutator, parts thereof being omitted to prevent confusion, the parts being arranged to produce a direct current. Fig. 4 is a diagrammatic representation of another form of the invention. Fig. 5 is a diagrammatic representation of the stator windings of Figs. 1 and 2. Fig. 6 is a diagrammatic development of the rotor windings and commutator in a plane, the parts being arranged to produce an alternating current. Fig. 7 is a diagrammatic development in a plane of a portion of the commutator, rotor windings and commutator brushes.

In order that the present improvement of the magnetic structure may be better understood I shall first assume the machine shown in Figs. 1 and 2 to possess evenly spaced stator and rotor teeth, describe its operation and thereupon compare it with that shown in the drawings.

Referring to Figs. 1 and 2, the machine consists of a stationary laminated element 3 provided on its inner face with thirty-two equidistantly spaced teeth 7 and a distributed winding 2 is lodged between the teeth. The coils of the winding 2 span and are connected to form a regular eight pole arrangement shown diagrammatically in Fig. 5. In accordance with a disclosure made in a prior application, the stator as above described requires a rotor with a larger or smaller number of equidistantly spaced teeth. The stator in this case has an eight pole winding and must, therefore, have four alined and four non-alined portions, a portion consisting of a plurality of consecutively alined or non-alined stator and rotor teeth 7 and 6. This condition is satisfied when the rotor is provided with thirty-six equidistant teeth 6, the stator 3 in this case having thirty-two teeth 7. The rotor may also be provided with a winding 12 similar to that on the stator, in so far as the coils are spread and connected for eight poles. In the standard practice, as is well known, a machine wound for eight poles produces four cycles per revolution, the eight pole machine above described will have thirty-six cycles generated in the stator windings and thirty-two cycles in the rotor windings per each revolution of the rotor; this is due to the formation by the stator and rotor teeth of four alined and four non-alined portions which are the equivalent of as many positive and negative poles respectively, which rotate at a much higher angular velocity than the rotor. The above arrangement requires the entire inner circumference of the stator 3 to be of the same polarity; therefore the flux enters the rotor 5 at all points of its circumference, and the magnetic circuit must be coupled from the rotor back to the stator through the steel portion of a side bracket.

In the present invention it is the purpose to produce the effect of a high velocity revolving field, with all of its advantages, in a machine in which the flux enters the rotor at one point and passes out at some other point of its circumference. This is shown in Figs. 2, 3 and 4. The rotor core 5 is circumferentially divided into two pairs of quarter sections, the opposing quarter sections being of the same polarity N or S and the successive quarter sections being of opposite polarity. Thus each quarter section 11 includes one alined portion and one non-alined portion and opposes two induced pole windings. The flux is constantly shifted from one end of the pole face, formed by the quarter section, to the other, thus preserving a substantially constant flux through each of the four field coils 9 and the field cores 8. All the rotor teeth 6 of one polarity are offset one-half tooth pitch against all the rotor teeth of the opposite polarity, that is at the point where the polarity is reversed, alinement has been changed to non-alinement. Thus, an increasing N magnetism, progressing across the top north quarter section, from left to right, when reaching the extreme end is supplanted by an increasing S magnetism in the adjoining quarter which continues to progress across its face in the same direction, and upon reaching the next section changes to an increasing N, thus producing an effect which is equivalent to that obtained by a rapidly revolving field.

The frequency is also the same, that is, thirty-two and thirty-six cycles in rotor winding and in the stator winding respectively per each revolution of the rotor.

In describing the commutating means I shall first confine myself to a single circuit and then show the relation between the plurality of circuits.

Fig. 3 is a diagrammatic representation of part of the winding, the commutator and brushes, the heavy lined portion of the winding and the dark segments belonging to a single circuit. In order to commutate to direct current, the high frequency current produced by a revolving field as above described, a progressing point of contact is established between a plurality of segments and brushes. We have seen that in the present machine there are thirty-two cycles per revolution generated in the rotor winding. The commutator 13 is, therefore, provided with thirty-two segments 24 per circuit; in Fig. 3 the segments belonging to one circuit have been shaded to distinguish them from the others. Each circuit consists of as many coils, that is, thirty-two coils, which are distributed over the entire circumference of the rotor and connected to the thirty-two segments in the well known manner and as partly shown by the heavy dash and full lines. Wiping the commutator there are twenty-eight stationary positive brushes 21 and as many negative stationary brushes 22. Taking into consideration the position of the positive brushes with respect to the shaded segments 24 belonging to one circuit, it is seen that there are four full points of contact at right angles to each other between the brushes 21 and shaded segments 24. Rotation of the commutator causes the four points of contact to rotate at the same angular velocity as the angular velocity of the rotating field with respect to the rotor coils. In this manner the points of contact between the brushes and the segments of one circuit retain at all speeds their neutral position with respect to the rotating field. There are as many negative brushes as there are positive, in this example they are twenty-eight in number, equidistantly spaced, each negative brush having a position midway between two positive brushes. The current entering one circuit of the winding 12 at the positive brush must traverse a plurality of coils in order to reach a negative brush. In Fig. 3 this is brought out by a portion of the winding consisting of coils $k$, $l$, $m$, $n$, the positive brush 21° and negative brush 22ᵖ. The circuit between the brushes 21° and 22ᵖ, which are in full contact with the shaded segments, is closed through the coils $k$, $l$, $m$, $n$, which spread 180 electrical degrees of the eight pole rotor winding while the two brushes in question span an arc on the commutator equal to four times the distance between the shaded segments, the total distance representing four cycles and consequently 1440 electrical degrees.

In addition to the single circuit described above, a part only of which for the sake of greater legibility has been shown by the heavy lines, there are a plurality of other circuits. Between each two shaded segments I provide for a plurality of additional segments, in this instance they are seven in number. These seven segments plus one of the shaded segments making eight consecutive segments I shall hereafter call a group, and the segments in each group will be designated by $24^a$, $24^b$, $24^c$, $24^d$, $24^e$, $24^f$, $24^g$, $24^h$. As many circuits are added so that the number of circuits equals the number of segments in one group, the present instance, therefore, requires eight circuits. In Fig. 3 I have shown only one group of the eight coils so that the drawing will not be confusing. The additional circuits are obtained by dividing each of the thirty-two coils required by the single circuit into eight parts $a$, $b$, $c$, $d$, $e$, $f$, $g$, $h$, each of the parts of one coil belonging to a different circuit. The first circuit consists of all $a$ coils and $a$ segments, the second is made up of all $b$ coils and $b$ segments, the third of $c$ coils and $c$ segments, and so on. The connection and operation of the first circuit has been fully described above, the connection and the operation individually of the second or $b$ circuit is precisely the same as that of the first. The same applies to all the other circuits. The circuits, however, have a certain relation to one another, that is, all of the leads of one circuit at the commutator are displaced to all of the leads of an adjacent circuit a distance equal to a group plus one segment, so that the lead from an adjacent circuit connects, not to the adjacent segment, but to an adjacent segment in the next group.

The thirty-two commutator segments $24^a$ belonging to the circuit of coils $a$ are indicated by shading on Fig. 3 to readily differentiate them from the other segments. These segments $24^a$ are evenly spaced apart around the circumference of the commutator, one end of each coil $a$ being connected to its proper segment $24^a$ by the lead $25^a$, the other end of the coil being connected to the next commutator segment $24^a$ by the lead $26^a$ shown in dotted lines. The commutator segments to which the similar ends of one group of coils are connected are displaced 360 electrical degrees around the commutators, the degrees being measured by the positions of the pole windings. Each eight successive commutator segments will be designated as a group and in the present instance each group extends from one segment $24^a$ to the next segment $24^a$ and includes one of the segments $24^a$. The leads from each group of eight coils are connected to the respective segments as follows: one end of coil $a$ is connected to segment $24^a$ in a group. The similar end of the coil $b$ is connected to segment $24^b$ in the next group, the similar end of coil $c$ is connected to segment $24^c$ in the third group, the similar end of coil $d$ is connected to segment $24^d$ in the fourth group, and so on, the similar end of coil $h$ being connected to segment $24^h$ in the eighth group. The similar ends of two individual coils in each slot are connected to segments which are spaced apart on the commutator a number of segments equal to the number of segments in one group, plus or minus one segment, depending upon whether the field rotates in the same or the opposite direction to the rotor. If the pitch of the teeth on the rotor is smaller than the pitch of the teeth on the stator, the field will rotate in the same direction as the rotor and if the pitch of the teeth on the rotor is larger than that of the stator teeth, the field will rotate in the opposite direction to the rotor. In the construction shown in Figs. 2 and 3 the field rotates in the same direction as the rotor and, therefore, the segments to which the similar ends of the coils lodged in one slot are connected are spaced apart the number of segments in a group plus one segment, or in other words, eight segments are interposed between the connections of the similar ends of each two adjacent coils in the same slot. The opposite ends of the coils are similarly connected to similarly spaced segments, there being seven segments interposed between the segments to which the opposite ends of one coil are connected.

At the upper part of Fig. 3 I have shown a plurality of adjacent commutator segments connected to their corresponding coils in the different individual circuits. The leading end of coil $a$ is connected to segment $24^a$, the leading end of coil $b$ in the next slot is connected to the adjacent segment $24^b$; the leading end of coil $c$ in the next slot is connected to the adjacent segment $24^c$; the leading end of coil $d$ in the next slot is connected to the adjacent segment $24^d$ and so on; the leading end of coil $h$, in a slot seven slots removed from the slot in which the coil $a$ is disposed, being connected to segment $24^h$ in the same group as the other segments. The opposite ends of the coils are connected to similar segments in the next group, that is between the two segments to which the leads of each coil are attached, there are interposed seven segments. This relation of the windings to the segments in connection with the arrangement of the brushes, causes the current in shifting from one segment to the adjacent segment to be shifted from each individual coil to a coil in the next slot, thereby jumping seven coils.

This arrangement also causes the current to be concentrated at as many places as there are induced winding poles and causes it to flow in all of the coils which have proper polarity and position with respect to the poles.

By the construction shown in Fig. 4, the relation of the toothed elements has been interchanged, in that the toothed pole-pieces 16 which are encircled by the energizing coils 17 are formed on the stator and the teeth on the rotor 18 are evenly spaced. In this construction I have employed two field poles 16 of opposite polarity, each extending for substantially one-half the circumference and the teeth on the two pole-pieces are offset a half tooth pitch with respect to each other, for the same reasons as heretofore set forth. The pitch of the teeth on the stator and on the rotor is such that an even spacing of the teeth on both elements will produce two alined and two non-alined portions. The windings on the stator and rotor are, therefore, those required by a four pole machine. Since the stator frequency per revolution is determined by the rotor teeth, it is in this case nineteen cycles, while the rotor frequency is less by the number of pole-pairs, hence the rotor winding frequency per revolution is seventeen.

As heretofore described in machines having a rotating field, the currents are commutated to unidirection by establishing a rotating point of contact between a rotating commutator and stationary brushes, which point has an angular velocity equal to the rotating field and higher than the velocity relation of the commutator with respect to the brushes.
I shall now describe how low frequency alternating currents may be collected at the commutator by providing for a rotating point of contact between the stationary brushes and the commutator segments belonging to one circuit which has an angular velocity higher or lower than that of the revolving field. In Fig. 6 I have shown an arrangement of teeth, commutator segments and brushes, for collecting such an alternating current. In this there is a greater number of teeth per pole on the stator 3 than on the rotor 5, so that the field will progress in the opposite direction from the rotor. There are ten teeth per pole pair, spreading an alined and a non-alined portion on the stator and nine teeth per pole pair on the rotor, and consequently frequency of ten cycles per pole pair will be generated in the rotor winding 12 for a movement of the rotor through the angular distance of a pole-pair. In the drawing I have diagrammatically shown nine individual circuits and nine individual coils composing a whole coil lodged in each slot.
The angular velocity of the field with respect to the rotor winding is greater than the angular velocity of the point of contact on the commutator with respect to the brushes, resulting in the collection of an alternating current at the brushes. The commutator segments belonging to one circuit are spaced circumferentially in accordance with the spacing of the teeth on the rotor and the positive brushes and the negative brushes are spaced in accordance with the teeth on the stator. The point of contact between the brushes of one sign and segments of one circuit progresses at the same angular velocity of the field with respect to the stator, but since the windings move in the opposite direction to the field, the angular velocity of the field with respect to the windings is greater than the angular velocity of the point of contact between the brushes and the segments of one circuit.

Since the field progresses in the opposite direction from the rotor, the distance between the commutator segments to which similar ends of the individual coils in one slot are connected is one group of segments minus one segment or eight segments. Since there are ten cycles per pole pair generated in the rotor windings and the relation between brushes and segments causes the point of contact to travel a distance equal to nine cycles per pole pair, an alternating current of one cycle per pole pair is collected at the brushes. There are nine groups of commutator segments K, L, M, N, O, P, Q, R, S, per pole pair and each group is composed of nine segments to which the coils are connected as heretofore described. One end of the individual coil 81 forming part of coil 80 is connected to segment $81^k$, of individual coil 82 to segment $82^l$; of individual coil 83 to $83^m$; of individual coil 84 to $84^n$; of individual coil 85 to $85^o$; of individual coil 86 to $86^o$; of individual coil 87 to $87^p$; of individual coil 88 to $88^q$; and of individual coil 89 to $89^r$. This shows the distribution of the segments connected to one end of the individual coils forming one main coil. The other ends of the individual coils are connected as follows: coil 81 to segment $81^l$; coil 82 to segment $82^m$; coil 83 to segment $83^n$; coil 84 to segment $84^o$; coil 85 to segment $85^p$; coil 86 to $86^p$; coil 87 to segment $87^q$; coil 88 to segment $88^r$ and coil 89 to segment $89^s$.
I shall now point out how the successive segments are connected to the coils and for the purpose of description I shall refer only to the left ends of the coils. Coil 49 is connected to segment $49^n$; coil 58 to segment $58^n$; coil 67 to segment $67^n$; coil 76 to segment $76^n$; coil 85 to segment $85^o$ which is adjacent to segment $76^n$; coil 94 to segment $84^o$; coil 103 to $103^o$; coil 112 to segment $112^o$ and coil 121 to segment $121^o$. The next segment is connected to coil 59, the next to 68, and so on.

It is well known that in the standard types of alternating current commutating machines, the coils undergoing commutation are short circuited by the brush because each coil is connected across adjacent segments. The sparking due to this short circuiting is reduced by inserting resistances in the armature leads. In the present machine the leads of each coil do not connect to adjacent segments, therefore, when used for alternating currents no local short circuit exists at that point. A path, however, exists beginning with one lead of the coil to the segment comprising the lead $26^a$, segment $24^a$, brush 21, collecting ring 36, brush, segment and the lead back to the other end of the coil. This path is of comparatively high resistance, including two brushes and two contacts in series. In order to increase the resistance, a resistance 37 shown in Fig. 7 may be inserted between each brush and the collecting ring, adding to the natural resistance of the local circuit that of two added resistances 37 in series. With relation to the collecting rings, however, all of the resistances are in multiple. It is apparent that for a small allowable drop of terminal potential in the multiple resistances the resistance of the local circuit would be large and consequently the commutation would be good.

In Fig. 7 I have shown diagrammatically a section of the commutator with several coils connected thereto, and several positive brushes wiping the commutator, and between the brushes and the collecting ring are shown the resistances 37.

While both of the machines described are energized by a direct current field winding, an additional method of excitation may be employed. This consists of a winding 2 embedded in the slots between the stator teeth, in which winding, by reason of the rotating field, a potential is generated. This winding, preferably polyphase, is connected across condensers 20 which supply it with a leading magnetizing current. The addition of condenser excitation enables the machine to generate a much larger output, it counteracts the rotor reaction and may be made, by proper adjustment of the condenser capacity, to keep the neutral point on the commutator from shifting at varying loads and thus improve the commutation. When the machine is used as a converter, the stator winding being supplied with current and the rotor generating current or vice versa, condenser excitation is not essential, since in this case the stator reaction neutralizes the rotor reaction.

In the machine shown in Fig. 2 the stator winding 2 is a two phase winding, the winding of one phase being shown in full lines and the winding of the other phase being shown in dotted lines. The stator winding is arranged for eight poles, as shown in Fig. 5, and the successive pole windings in each phase are reversed. The two phase windings are connected across the condensers 20 which produce a leading magnetizing current.

It is apparent that the machine of my invention can be used as a direct current generator or motor or as an alternating current generator or motor. It is to be noted that the brushes act as connectors and equalizers between all of the independent circuits and that the current entering the commutator through all of the brushes of one sign is concentrated in those coils which have quadrature relation to the field, or to as many points as there are armature pole windings. In a machine with multiple circuits, all of the brushes are active all the time, resulting in high brush economy and permitting the width of the commutator to be reduced. The formation of individual circuits allows the coils to be made of lighter conductors, resulting in greater flexibility of the coils and consequent ease of forming, winding and connecting. The current per coil and brush is small in comparison to that which obtains in a single circuit winding and the commutation is, therefore, improved. It is also to be noted that the generated frequency of the stator or rotor currents is entirely independent of the number of field poles and coils; the number of induced stator or rotor pole windings is independent of the number of field poles as well as independent of the frequency of the generated current. Therefore, in the first place, a number of field poles are chosen, such as will give the highest economy of field copper and current, then the number of armature pole windings is chosen which will result in the smallest armature copper and potential drop irrespective of the frequency and field poles; a selection of the teeth which will give the desired frequency and a difference in the pitch of stator and rotor teeth such as would cause, in a unipolar arrangement, the formation of as many open and closed portions as there are induced pole windings on stator or rotor.

I claim:

1. In a dynamo electric machine of the commutating type, the combination of means, including a rotatable element, for producing a progressive magnetic field having a higher angular velocity than said rotatable element, a circumferentially distributed induced winding arranged to be cut by said field and have a current generated therein, a commutator connected to said winding and brushes wiping said commutator, said winding, commutator and brushes being arranged so that a current enters the induced winding through said commutator at a larger number of equidistant points on the circumference of the commutator than there are pole pairs and is concentrated in the circumferentially distributed induced winding at a smaller number of points, the point of maximum current in said induced winding being caused to progress at a higher angular velocity than the angular velocity of the commutator with respect to the brushes.

2. In a dynamo electric machine of the commutating type, means, including a rotatable element, for producing a progressing magnetic field of higher angular velocity than the rotatable element, a circumferentially distributed induced winding arranged to be cut by said field and have a current generated therein, a commutator connected to said winding and brushes wiping said commutator, said winding, commutator and brushes being arranged to permit the induced winding to be entered by current through a larger number of equidistant points on the circumference of the commutator than there are pole pairs, to concentrate the current at as many points in the winding as there are induced winding poles and to cause the point of maximum current in the winding to progress at a higher angular velocity than the angular velocity of the commutator with respect to the brushes.

3. In a dynamo electric machine of the commutating type, means, including a rotatable element, for producing a magnetic field having a higher angular velocity than the rotatable element, a circumferentially distributed induced winding composed of a plurality of circumferentially distributed independent circuits, each circuit being composed of a plurality of circumferentially distributed coils, a commutator associated with said circuits having as many sets of segments as there are independent circuits, each set being composed of as many evenly spaced segments as there are coils per circuit, a plurality of stationary positive and negative brushes wiping said commutator, said brushes being spaced to produce rotating positive and negative contact points between the brushes and each set of segments having higher angular velocity than the commutator, the said circuits being arranged with respect to each other so that a current entering the induced winding through the commutator at a larger number of equidistant points than there are inducing winding poles will be concentrated at as many points in the winding as there are induced winding poles and only in those coils which have proper polarity and relation with respect to the field.

4. In a dynamo electric machine of the commutating type, the combination of means for producing a magnetic field, a circumferentially distributed induced winding arranged to be cut by said field and have a current generated therein, a commutator connected to said winding and brushes wiping said commutator, said brushes being arranged so that a current enters the induced winding through said commutator at a larger number of equidistant points on the circumference of the commutator than there are pole pairs and is concentrated in the induced winding at a smaller number of points, the point of maximum current in the induced winding being caused to progress at a higher angular velocity than the angular velocity of the commutator with respect to the brushes.

5. In a dynamo electric machine of the commutating type, the combination of means for producing a magnetic field, a circumferentially distributed induced winding composed of a plurality of circumferentially distributed independent circuits, each circuit being composed of a plurality of circumferentially distributed coils, a commutator associated with said circuits composed of as many sets of segments as there are independent circuits, each set being composed of as many evenly spaced segments as there are coils per circuit, a plurality of stationary positive and negative brushes, spaced to produce rotating positive and negative contact points between the brushes and each set of segments having higher angular velocity than the commutator, the said circuits being arranged with respect to each other so that a current entering the induced winding through the commutator at a larger number of equidistant points than there are induced winding poles will be concentrated at as many points in the winding as there are induced winding poles, and only in those coils which have proper polarity and relation with respect to the field.

6. In a dynamo electric machine, a circular regularly toothed element, a second circular element opposing the first having its face divided into a plurality of magnetized sections forming successive north and south pole faces, a plurality of regularly spaced teeth on each pole face differing in pitch from the teeth on the first named element, the teeth on the two elements forming at least one closed and one open portion per section, each portion consisting of a plurality of consecutive alined or a plurality of consecutive non-alined teeth, rotation of one of said elements producing rapidly progressing increasing and decreasing fluxes across the face of each section, the teeth on one section being arranged with relation to the teeth on an adjoining section of opposite polarity so that an increasing north magnetic flux progressing across one section is supplanted by an increasing south magnetic flux at the adjacent section and a circumferentially distributed induced winding on one of said elements.

7. In a dynamo electric machine, a toothed stationary element and a toothed rotatable element, the teeth on one of said elements being equidistantly spaced circumferentially, the circumferential face of the other element being divided into a plurality of poles, the teeth on each pole being equidistantly spaced and being of a different angular pitch than the teeth on the other element, the teeth on the successive poles being so arranged that when teeth on one pole are alined with teeth on the opposing element, corresponding teeth on the adjacent pole are non-alined with teeth on the opposing element, magnetizing windings encircling said poles and producing a magnetic field and a circumferentially distributed winding arranged to be cut by said field.

8. In a dynamo electric machine of the commutating type, the combination of means for producing a magnetic field, a circumferentially distributed induced winding composed of a plurality of circumferentially distributed independent circuits, each circuit being composed of a plurality of circumferentially distributed coils, a commutator associated with said circuits, consisting of as many sets of segments as there are independent circuits, each set being composed of as many evenly spaced segments as there are coils per circuit, a plurality of positive and negative brushes wiping the commutator, the number of positive brushes and the number of negative brushes differing from the number of coils in each circuit by one-half the number of induced winding poles, the said circuits being arranged with respect to each other so that a current entering the commutator through all of the brushes of one sign is concentrated at as many points in the winding as there are induced winding poles and only in those coils which have proper polarity and relation with respect to the field.

9. In a dynamo electric machine, a toothed stationary element and a toothed rotatable element, the face of one of said elements being divided into a plurality of magnetized sections forming successive north and south pole faces, the teeth on each pole face being regularly spaced and differing in pitch from the teeth on the other element, the teeth on the two elements forming at least one alined portion and one non-alined portion at each section, rotation of one of said elements causing the alined portion to move at a higher angular velocity than the rotating element, means for producing a magnetic flux traversing the alined portion of each section, a circumferentially distributed winding arranged to be cut by said rapidly rotating flux, a commutator connected to said winding and brushes wiping said commutator, said brushes being so arranged with relation to the commutator segments that current enters the winding through the commutator at a larger number of points than there are pole pairs in the winding and is concentrated in the winding at as many points as there are induced winding poles.

10. In a dynamo electric machine, a toothed stator and a toothed rotor, the teeth on one of said elements being regularly spaced circumferentially, the face of the other element being divided into a plurality of sections, the teeth on each section being regularly spaced and being of a different angular pitch from the teeth on the other element, so that in one position the teeth on the opposite ends of one section are alined with the teeth on the other element and the teeth at the center of the section are non-alined with the teeth on the other element, means for producing a north and south magnetism in the successive sections whereby a magnetic field is produced, the teeth on one section being offset with relation to the teeth on a section of opposite polarity so that when certain teeth on a section of one polarity are alined with teeth on the other element, corresponding teeth on a section of opposite polarity are non-alined with the teeth on the other element, and a circumferentially distributed winding arranged to be cut by said field.

11. In a dynamo electric machine, a toothed stationary element and a toothed rotatable element, the face of one of said elements being divided into a plurality of magnetized sections forming successive north and south pole faces, the teeth on each pole face being regularly spaced and differing in angular pitch from the teeth on the other element, the teeth on the two elements forming at least one alined portion and one non-alined portion at each section, rotation of one of said elements causing the alined portion to move at a higher angular velocity than the rotating element and means for producing a magnetic flux traversing the alined portion of each section.

In testimony whereof, I have hereunto set my hand at San Francisco, California, this 18th day of December 1914.

ALFONS H. NEULAND.

In presence of—
H. G. Prost,
J. B. Gardner.